United States Patent [19]

Kumazaki et al.

[11] Patent Number: 5,404,431
[45] Date of Patent: Apr. 4, 1995

[54] IMAGE DRAWING WITH IMPROVED AREA RATIO APPROXIMATION PROCESS

[75] Inventors: Hitomi Kumazaki, Koshigaya; Yoshiaki Hanyu, Tokyo; Takashi Sato, Yokohama, all of Japan

[73] Assignee: Ricoh Company, Ltd., Tokyo, Japan

[21] Appl. No.: 978,513

[22] Filed: Nov. 18, 1992

[30] Foreign Application Priority Data

Nov. 20, 1991 [JP] Japan .................... 3-331224

[51] Int. Cl.⁶ .................... G06F 15/72; G06F 15/62
[52] U.S. Cl. .................... 395/143
[58] Field of Search .................... 395/141, 143; 345/16, 345/17, 18, 135, 136, 137

[56] References Cited

U.S. PATENT DOCUMENTS

| | | | |
|---|---|---|---|
| 5,123,085 | 6/1992 | Wells et al. | 395/121 |
| 5,202,960 | 4/1993 | Seiler | 395/143 |
| 5,237,650 | 8/1993 | Priem et al. | 395/143 |
| 5,287,442 | 2/1994 | Alcorn et al. | 395/143 |

OTHER PUBLICATIONS

"*A Comparison of Antialiasing Techniques*" article by IEEE CG & A Jan. 1981, pp. 40–48.

*Primary Examiner*—Phu K. Nguyen
*Attorney, Agent, or Firm*—Popham, Haik, Schnobrich & Kaufman, Ltd.

[57] ABSTRACT

A cross point detection part detects respective positions of cross points of an image's edge crossing sides of respective pixels. An approximated area ratio determination part determines respective approximated area ratios obtained as a result of approximating respective area ratios of areas occupied by the image in the respective pixels by using the positions of the cross points. A darkness determination part determines respective darknesses of the respective pixels in accordance with the approximated area ratios.

26 Claims, 17 Drawing Sheets

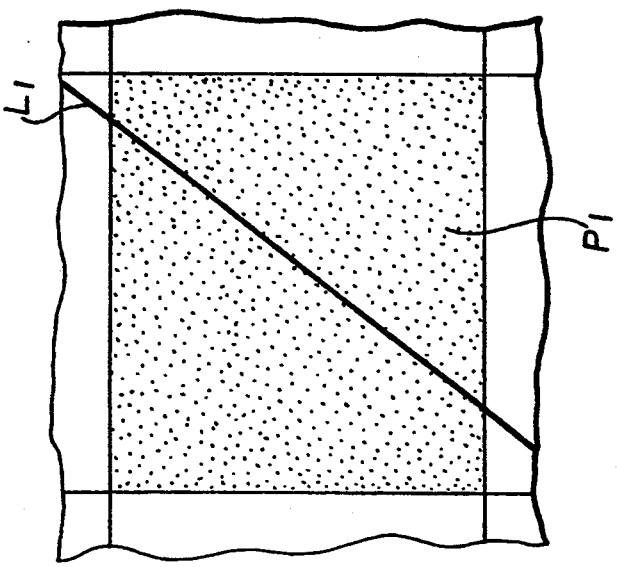
FIG. IA
PRIOR ART
1 x 1
k = 255
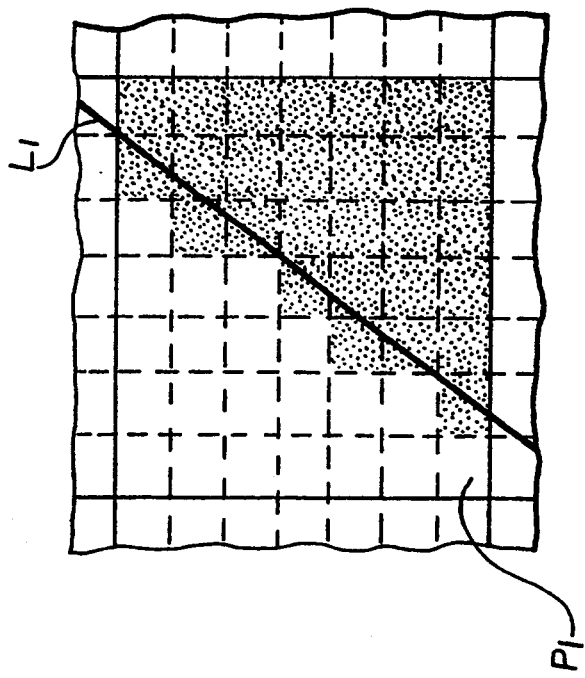
FIG. IB
PRIOR ART
7 x 7
k = 255 x 28/49

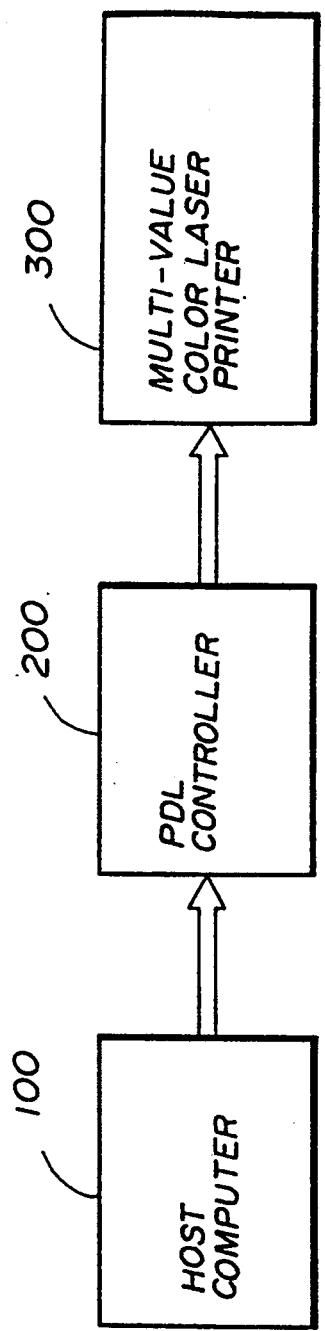

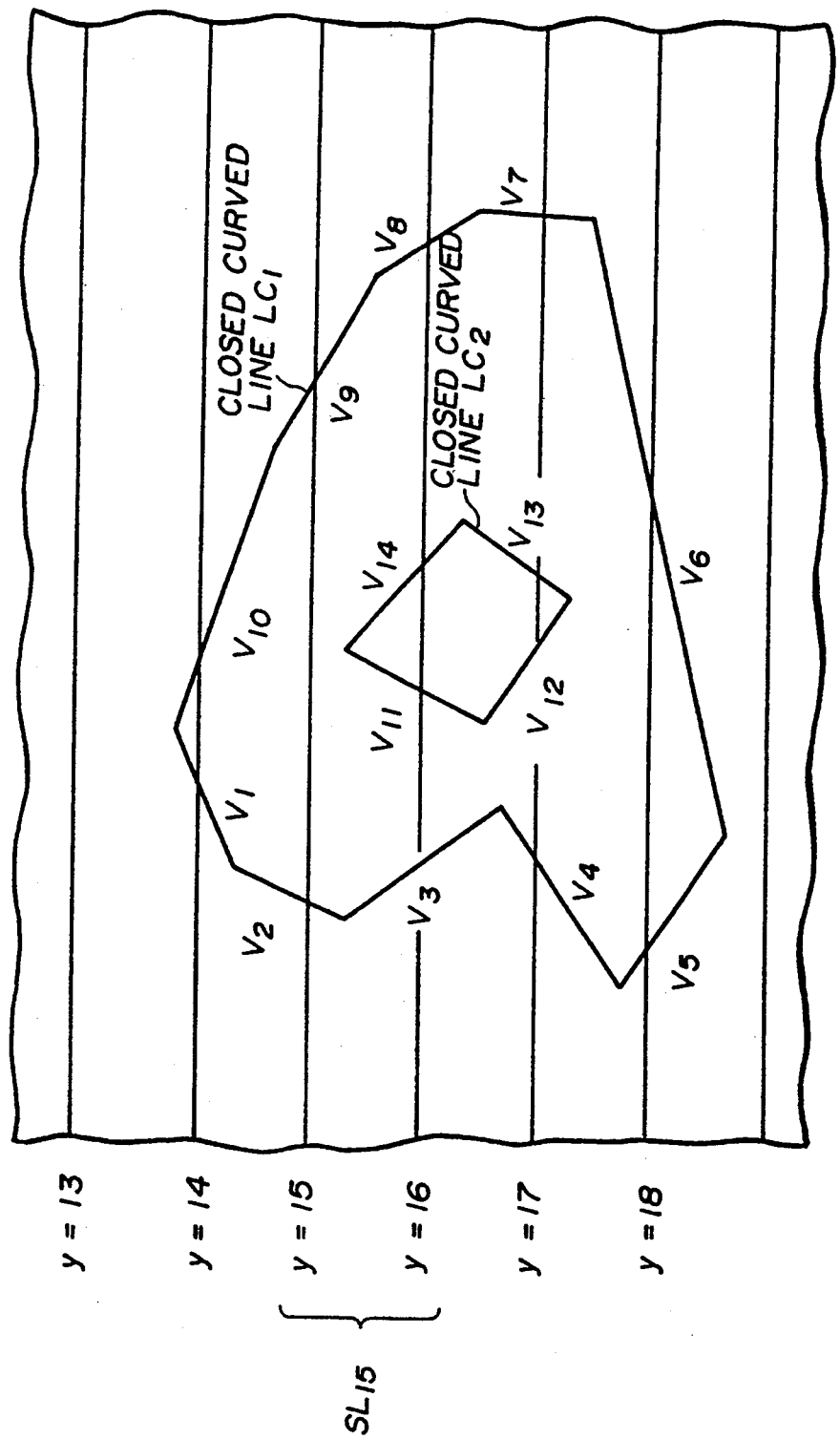

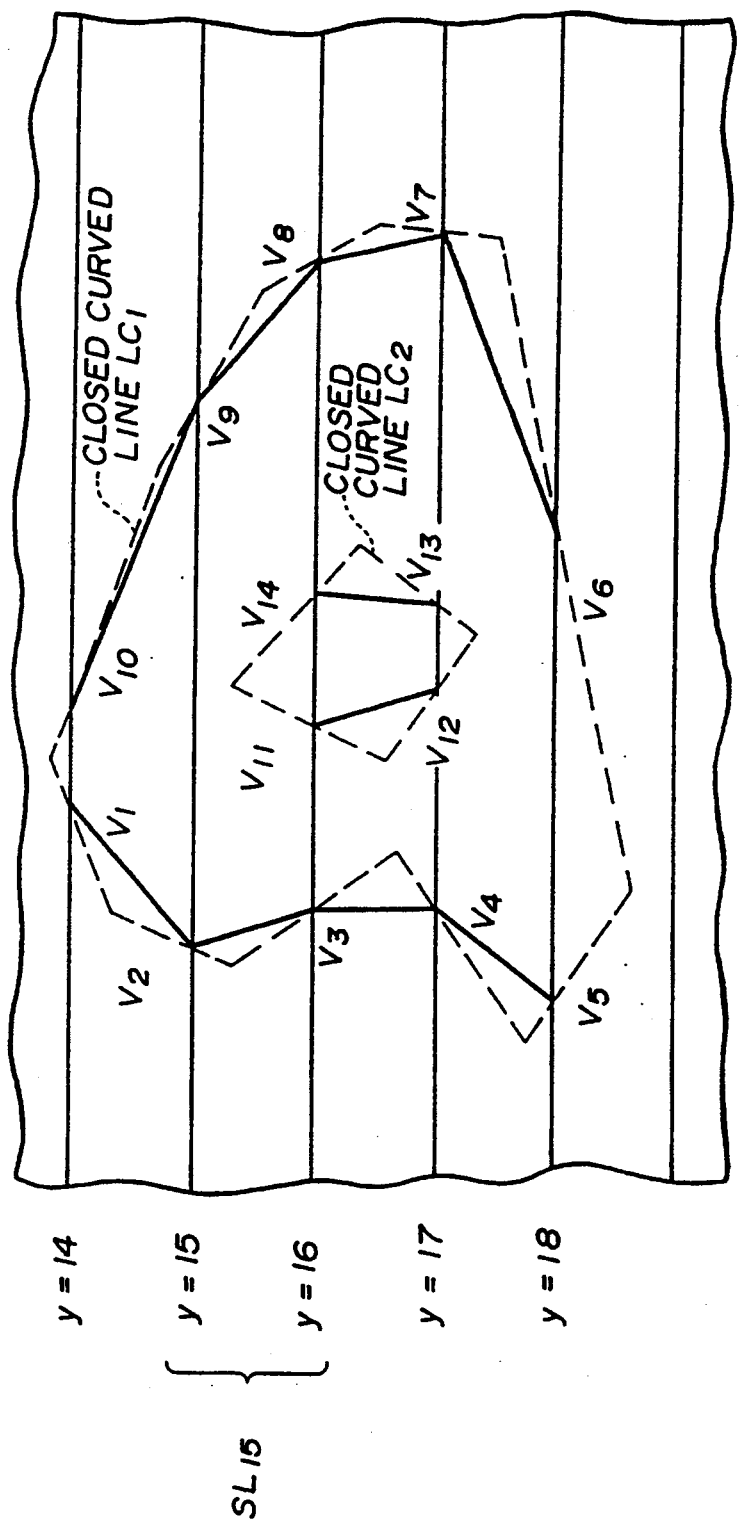

FIG.6

| VECTOR | CONTINUITY FLAG | STARTING POINT | VERTEX FLAG | ENDING POINT | VERTEX FLAG |
|---|---|---|---|---|---|
| 1 | 11 | $X_1, Y_1$ | 1 | $X_2, Y_2$ | 0 |
| 2 | 11 | $X_2, Y_2$ | 0 | $X_3, Y_3$ | 0 |
| 3 | 11 | $X_3, Y_3$ | 0 | $X_4, Y_4$ | 0 |
| 4 | 11 | $X_4, Y_4$ | 0 | $X_5, Y_5$ | 0 |
| 5 | 11 | $X_5, Y_5$ | 0 | $X_6, Y_6$ | -1 |
| 6 | 12 | $X_6, Y_6$ | -1 | $X_7, Y_7$ | 0 |
| 7 | 12 | $X_7, Y_7$ | 0 | $X_8, Y_8$ | 0 |
| 8 | 12 | $X_8, Y_8$ | 0 | $X_9, Y_9$ | 0 |
| 9 | 12 | $X_9, Y_9$ | 0 | $X_{10}, Y_{10}$ | 0 |
| 10 | 12 | $X_{10}, Y_{10}$ | 0 | $X_1, Y_1$ | 1 |
| 11 | 21 | $X_{11}, Y_{11}$ | 1 | $X_{12}, Y_{12}$ | 0 |
| 12 | 21 | $X_{12}, Y_{12}$ | 0 | $X_{13}, Y_{13}$ | -1 |
| 13 | 22 | $X_{13}, Y_{13}$ | -1 | $X_{14}, Y_{14}$ | 0 |
| 14 | 22 | $X_{14}, Y_{14}$ | 0 | $X_{11}, Y_{11}$ | 1 |

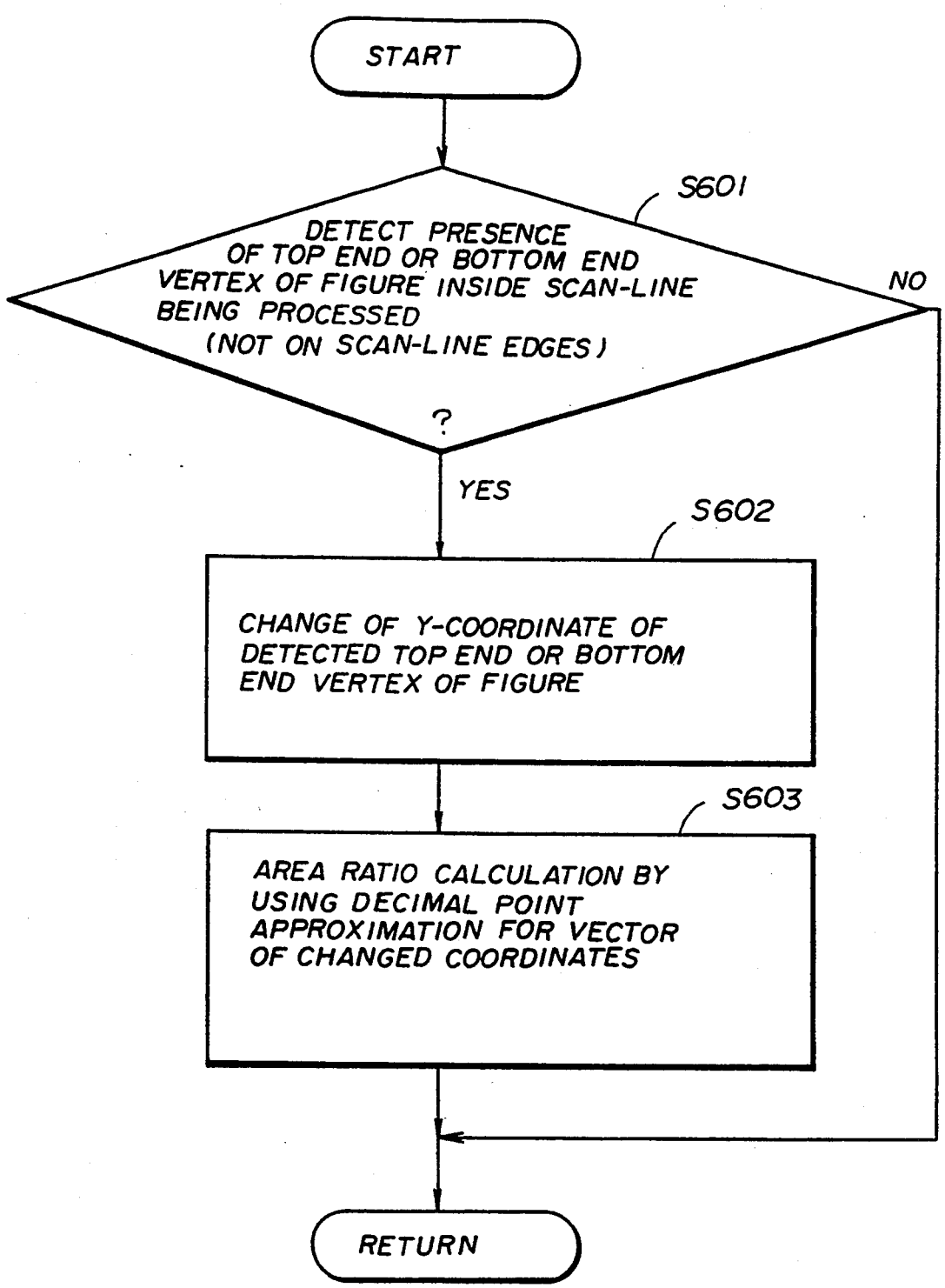

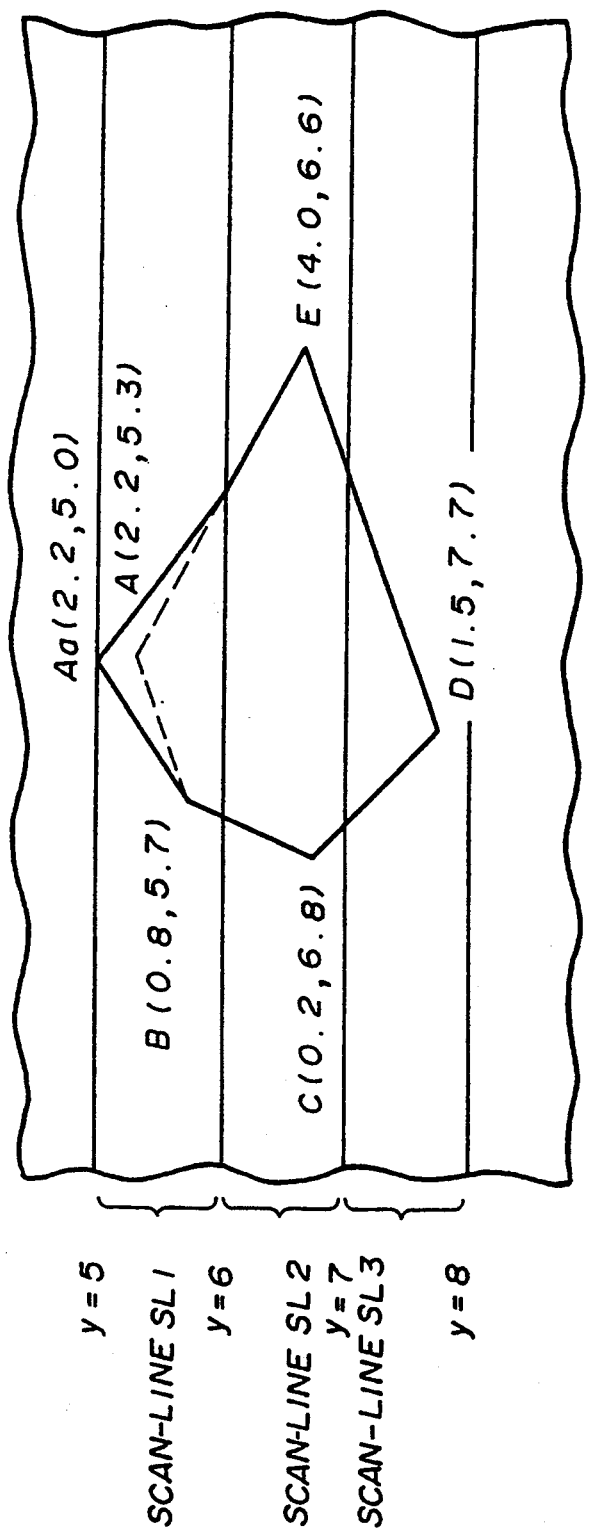

IMAGE DRAWING WITH IMPROVED AREA RATIO APPROXIMATION PROCESS

BACKGROUND OF THE INVENTION

The present invention relates to image drawing apparatus and method thereof whereby an anti-aliasing process is executed. The anti-aliasing process is a process for removing undesirable jaggedness or "stair-step" (shaped like the steps of a stair) appearing on the edge of the output image. The present invention particularly relates to an image drawing apparatus and method by which a high speed anti-aliasing process can be realized. One type of the image drawing apparatus is a vector image drawing apparatus. Hereinafter, "vector" means a line (it can be a straight line or a curved line) having a certain length and position and extending in a certain direction, and "a vector image" means a image comprising such a vector or vectors. A vector comprising a straight line is referred to as "a straight line vector" and a vector comprising a curved line is referred to as "a curved line vector", hereinafter.

Recently, use of a vector image printing system in variable fields has begun, which vector image is treated in a computer graphics process. The reason for this is that the so-called DTP (desk top publishing, meaning a publishing system utilizing the personal computer) has come into wide use. A typical example of the vector image printing system is the system using the "postscript" (a trade name) of Adobe System Incorporated-(U.S.A.). The "postscript" belongs to the language group referred to as the page description language (this is referred to as PDL hereinafter), which is the programming language for describing the form of contents constituting a document page. The form of contents includes the text (a part comprising characters) and the graphics, both of which are included in the document page, and the form of contents also includes the arrangement and style of the text and graphics. A vector font is applied as the character font for such a system as mentioned above.

Applying such a vector font as the character font improves the character printing quality (even if the dimensions of the character are enlarged or reduced to various sizes) much more than the system in which the bit-map font (for example, the conventional ward processor) is applied as the character font. Further, applying such a vector font enables a printing in which the character font and graphics are combined together.

However, most laser printers or other printing apparatus used for such a vector image printing system have resolutions of not finer than from 240 dpi (dot per inch) to 400 dpi. Such a coarse resolution may cause undesirable jaggedness or "stair-step" to appear on the edge of the printed figure. Such a phenomena is referred to as "aliasing". There is a method whereby an anti-aliasing process is executed to obtain a more beautiful (having a smooth edge) character printing image. In such a process, a darkness modulation is performed for the part where such a stair-step (jaggedness) appears on the edge of the printed figure. Thus a character printing image which appears smooth to the eye can be obtained. "Darkness modulation" means that the darkness of each pixel is controlled in accordance with a below mentioned area ratio.

The averaging filtering method, the weighted filtering method, the convolution method, or some other method is generally applied to execute the anti-aliasing process for the vector image drawing apparatus in art related to the present invention.

The averaging filtering method is described below. Each pixel is divided into sub-pixels such as N*M (N and M are, respectively, natural numbers), that is, each pixel has N rows and M columns of sub-pixels. Then, after a raster calculation so as to keeping the fine resolution is executed, the darkness of each pixel is obtained as a result of averaging the darknesses of the respective $N \neq M$ sub-pixels.

An averaging filtering method whereby the anti-aliasing process is executed, is described more concretely with reference to FIGS. 1A and 1B. In a case where the edge of the image overlaps the pixel (for example in FIG. 1A, where the image overlaps a pixel $P_1$, the image presents in the right bottom side of the line $L_1$, that is, the right bottom side of the line $L_1$ is to be painted to be dark), if the anti-aliasing process is not executed, then the maximum darkness of indicatable tones (for example, $k=255$, if the maximum number of tones is 256) is allocated for the darkness k of the pixel $P_1$, as shown in FIG. 1A.

In the averaging filtering method in which $N=M=7$ whereby the anti-aliasing process is executed for the pixel $P_1$, the following method is executed: the pixel $P_1$ is divided into $7 \neq 7$ sub-pixels; then the sub-pixels (hatched) overlapped by the image are counted; the number of the counted sub-pixels (this number is 28 in the example of FIG. 1B) is then divided by the number of all the sub-pixels in the pixel $P_1$, the number of all sub-pixels (this number is 49 in this example), that is, the darknesses of the 49 sub-pixels: in the pixel $P_1$, then being standardized (averaged). The result of this division, that is the area ratio (approximately 0.57, in this example), is then multiplied by the maximum darkness (255), so that approximately 145 is then obtained, that is, the calculation of the darkness k (145) of the pixel $P_1$.

As mentioned above, the darkness k of each pixel is determined in accordance with the number of the sub-pixels in each pixel, which sub-pixels the image overlaps.

A problem, in applying the averaging filtering method of the vector drawing apparatus to execute the above mentioned anti-aliasing process, is described below. A long time is required to calculate the area ratio, which area ratio is calculated by the following method: the pixel is divided into a plurality of sub-pixels (for example, 49 sub-pixels); the sub-pixels overlapped by an image are counted; and then the area ratio is obtained. This results in it being difficult to improve the indicating speed and/or the printing speed. Particularly in the above mentioned convolution method, it is difficult to improve the processing speed because a long time is needed to calculate the area ratio and also because a process for each pixel includes a process with regard to another plurality of pixels.

SUMMARY OF THE INVENTION

A general object of the present invention is to provide an image drawing apparatus and method thereof having a high processing speed whereby the anti-aliasing process is executed. A particular object of the present invention is to provide an image drawing apparatus and method having a high processing speed whereby the anti-aliasing process is executed to obtain area ratios for pixels.

To achieve the particular object, an image drawing apparatus according to the present invention comprises:

cross point detection means for detecting: respective positions of cross points of an image's edge crossing sides of respective pixels;

approximated area ratio determination means for determining respective approximated area ratios obtained as a result of approximating respective area ratios of areas occupied by the image in respective pixels by using the positions of the cross points; and darkness determination means for determining respective darknesses of respective pixels in accordance with the approximated area ratios.

In the above mentioned composition, the approximated area ratio can be obtained at a high rate of speed, without executing an operation such as the above mentioned dividing of sub-pixels and counting of sub-pixels overlapped by the image and other extra operations. The above mentioned approximated area ratio is used for determining darkness of each pixel present at the edge of the image as mentioned above.

Another particular object of the present invention is to provide an image drawing apparatus and method which enables fine quality character printing.

To achieve the particular object of the present invention, the above mentioned image drawing apparatus further comprises pseudo-edge-line forming means for forming a pseudo-edge-line by connecting respective cross points of the image's edge crossing two groups of sides of a plurality of pixels, the two groups of sides of the plurality of pixels being positioned opposite each other, the plurality of pixels being adjacent to each other in the scanning direction, the two groups of sides of the plurality of pixels extending in the scanning direction, and the cross point detecting means detecting cross points of the pseudo-edge-line crossing the two groups of sides of the plurality of pixels. (Use of the pseudo-edge-line forming means results in the appropriate area ratio, being easily obtained for each pixel located in the edge of the image, for one of the following figures: the figure constituted of the group of vectors (lines), the Y-direction (perpendicular to the scanning direction) height of each vector being smaller than the width of the scan-line (between the both groups of sides of the plurality of pixels); the figure including the figure part where one edge part on the scan-line is constituted of a plurality of vectors).

Further, in the above mentioned image drawing apparatus according to the present invention, the pseudo-edge-line forming means forms the pseudo-edge-line so as to also cross the second group of sides of the plurality of pixels if the image's edge crosses only the first group of sides of the plurality of pixels (in this case, the vertex of the figure of the image is located between the two groups of sides of the plurality of pixels).

Due to the above mentioned pseudo-edge-line forming means, fine quality character (the image) printing is ensured (by the appropriate darkness being assigned to each pixel located in the edge of the image) even if the algorithm of the above mentioned approximation method is applied when, in the anti-aliasing process, the area ratio is calculated for, for example, one of the following figures of the image: the figure constituted of the group of vectors (lines), the Y-direction (perpendicular to the scanning direction) height of each vector being smaller than the width of the scan-line (between the both groups of sides of the plurality of pixels); the figure including the figure part where one edge part on the scan-line is constituted of the plurality of vectors; and the figure including the vertex part of the figure on the scan-line.

Other objects and further features of the present invention will become more apparent from the following detailed description when read in conjunction with the accompanying drawings.

BRIEF DESCRIPTION OF THE DRAWINGS

FIGS. 1A and 1B show illustrations of the averaging filtering method whereby the anti-aliasing process is executed;

FIG. 2 shows a block diagram of an image forming system having a vector image drawing apparatus according to the present invention acting as a PDL controller;

FIGS. 5A and 5B illustrate a continuity flag and the pseudo-vector;

FIG. 6 shows a table wherein lines, which are respective elements of PDL supplied to the PDL controller, are registered;

FIG. 8 shows an operation flow chart of a process for calculating the approximated area ratio in a case where the top end or bottom end vertex of the figure is present in the scan-line;

FIGS. 9A and 9B illustrate the calculation process of FIG.8;

DESCRIPTION OF THE PREFERRED EMBODIMENT

A description is given below, with reference to FIG. 2, of an embodiment of a vector image drawing apparatus and method thereof according to the present invention, the apparatus acting as the PDL controller 200. The operator makes the document described in the PDL (page description language), such as typically the so-called postscript, by using the application software employed in the host computer 100. This document is transferred into the PDL controller 200 page by page. The PDL controller 200 expands the PDL in the input document into multi-value image data while performing the anti-aliasing process on the PDL in the document, and then stores the obtained multi-value image data into the appropriate page memory. Then, after performing the above mentioned process for one page of the document, the controller 200 prints characters of the page via the multi-value color laser printer 300.

The word "multi-value" (used in the expressions "multi-value image data" and "multi-value page memory") means that the darkness of each pixel can vary in the range of multi-tone darkness, for example, 255 tones of darknesses between white and black. In contrast, "two-value" means that the darkness of each pixel can vary in the range of two-tone darkness, for example, white and black, respectively represented by the binary numerals "0" and "1".

Figure 3:
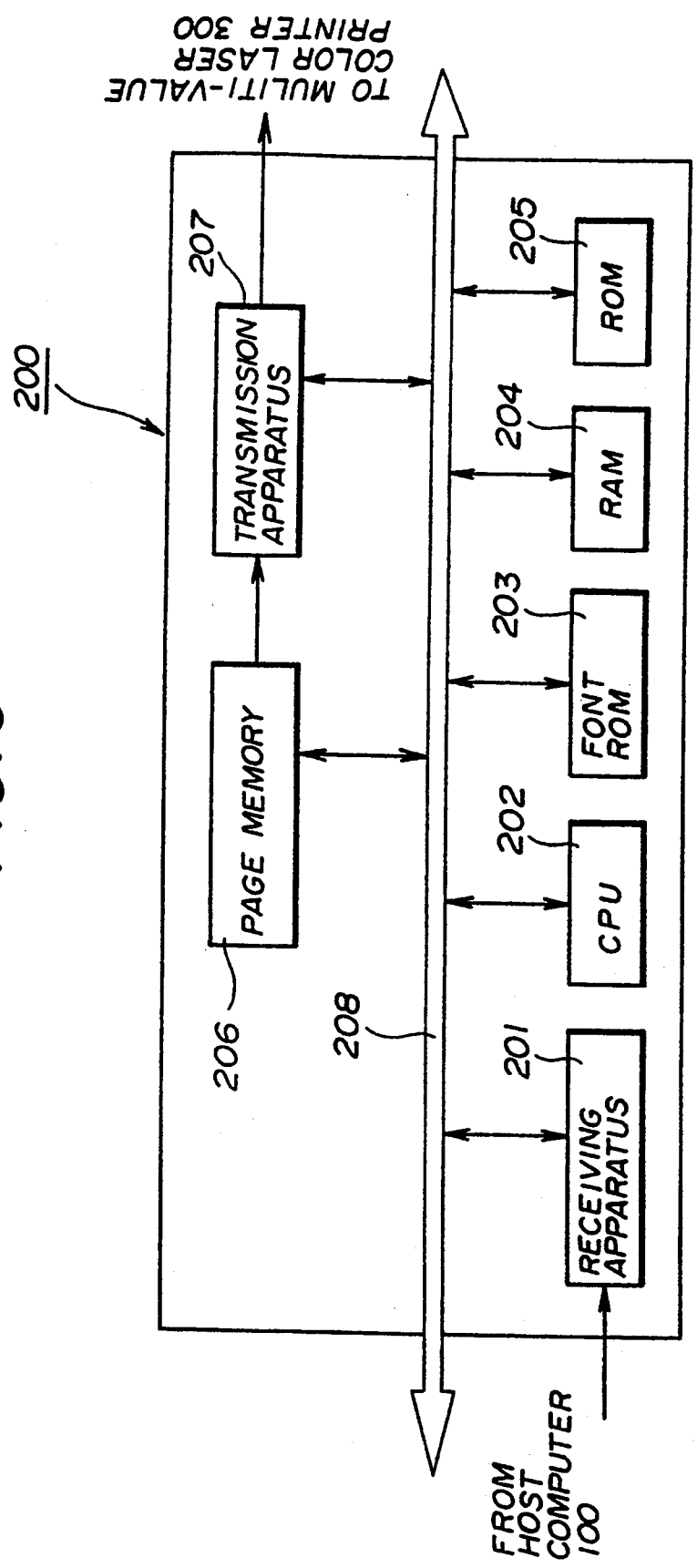
FIG. 3 shows a block diagram of the PDL controller.

A composition of the PDL controller 200 (corresponding to the vector image drawing apparatus according to the present invention) is described below with reference to FIG. 3. A receiving apparatus 201 receives data supplied from the host computer 100. A CPU 202 executes the control of the entire controller 200 in accordance with several kinds of control programs. The CPU 202 acts as cross point detecting means, approximated area ratio determination means:, darkness determination means, pseudo-edge-line forming means, and straight line approximating means. A font ROM 203 employs stored vector fonts. A RAM 204 is used for temporarily storing data used in the operation of the control program and reading the data. A ROM 205 employs several stored control programs to be used by the CPU 202. A page memory 206 is used for storing image data for one page (data of the pixel unit in this embodiment). A transmission apparatus 207 transmits the image data stored in the page memory 206 into the multi-value color laser printer 300. The controller 200 further comprises an internal system bus 208.

Figure 4A:
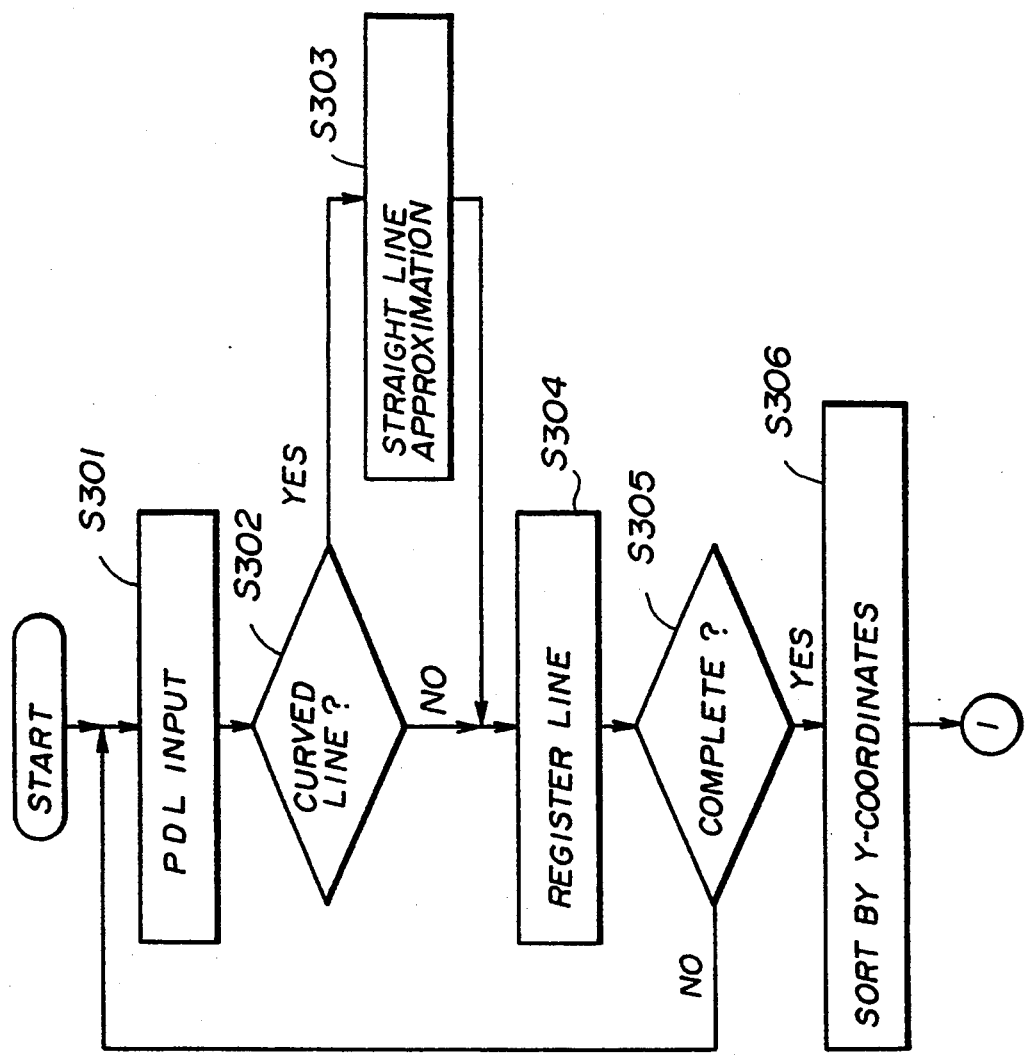
FIGS. 4A and 4B show operation flow charts showing an operation flow of the PDL controller.
Figure 4B:
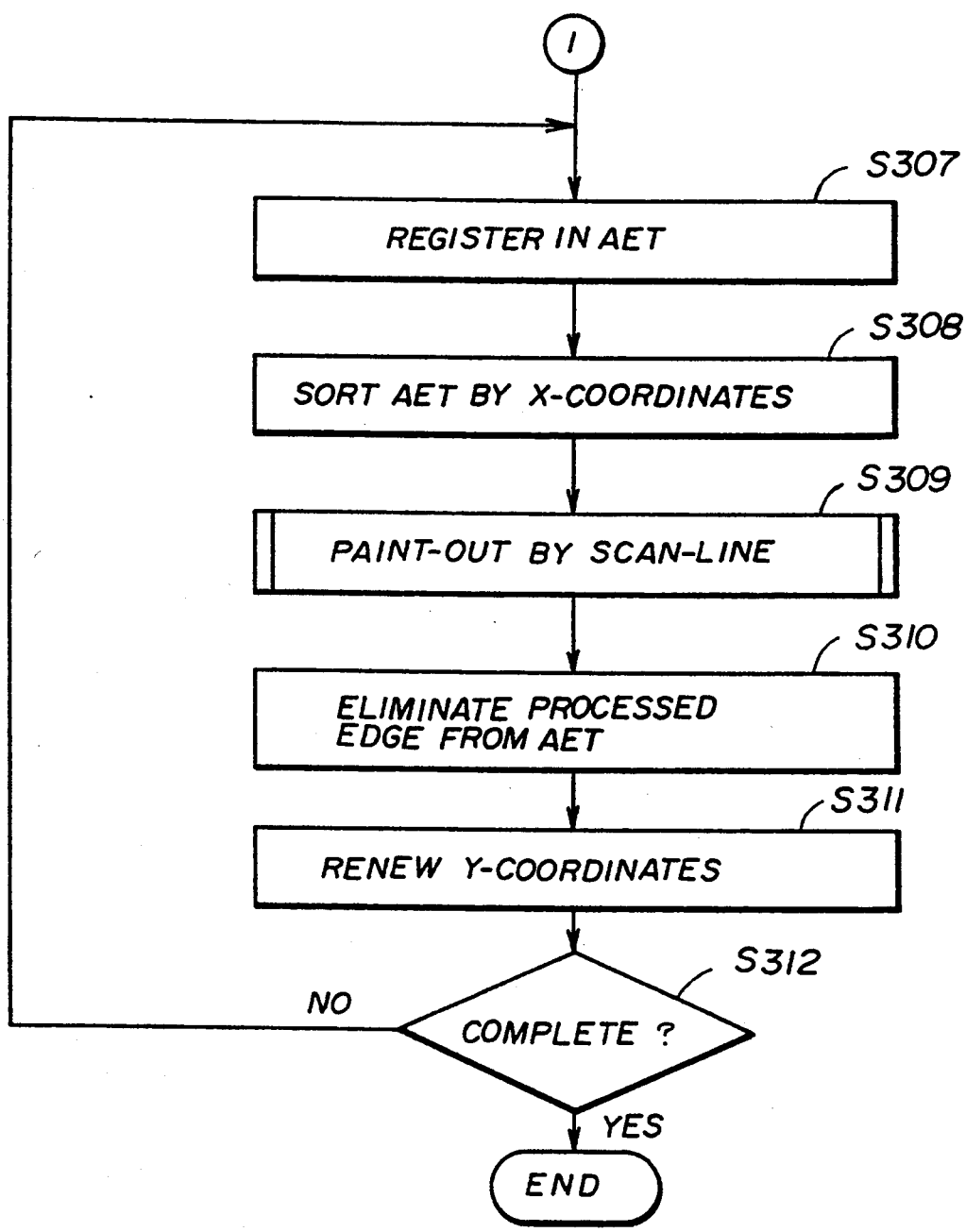

An operation flow of the control program stored in the ROM 205 is described below with reference to FIGS. 4A and 4B. PDL is applied in a step (this word "step" is omitted for the sake of simplicity hereinafter) S301. Then, if the curved line is included in the PDL as an element (S302), the curved line is approximated into corresponding straight lines (S303), the obtained straight lines then being registered (S304). Unless any curved line is included in the PDL (S302), the lines included in the PDL are registered without any change (S304). A process such as mentioned above is performed on all figures and character elements, then lines (all of which are straight lines) corresponding to all elements included in the PDL are registered after approximating included curved lines into corresponding straight lines (S305). Then, each element of the registered lines is sorted with respect to the Y-coordinate of the starting point of the respective line (S306).

A painting-out process operation flow is described below with reference to FIG. 4B. The painting-out process is performed for each scan-line. Thus, all vectors included in one scan-line are registered in AET (active edge table) (S307). Then, the vectors registered in AET are sorted with respect to the X-coordinate value in the sequence from the vector having the smallest X-coordinate to the vector having the largest X-coordinate (S308). Then, each of the spaces between the pairs of the elements (which elements are vectors in the AET, and are selected in an order starting from the first one) is alternately painted-out or not painted out, which elements are vectors in the AET respectively selected in an order starting from the first one (a painting-out process by a scan-line) (S309). The approximated area ratio according to the present invention is calculated in the above mentioned painting-out process, as described in detail below.

Then, the processed edge (a vector of the edge already processed) is eliminated from the AET (S310), and the Y-coordinates are then renewed so as to be processed next (S311). The process of S307 through S311 is repeated until the process for all lines is completed (S312).

Details of the above mentioned operation flow are partially described below. In the above mentioned line registration performed in S304, continuity information is generated, which information represents the continuity between vector data and other vector data, both of which data form the outline of the figure, and the information is then added to vector information. The expression "vector information" means information including data necessary for determining the vector corresponding to the vector information, which data includes the coordinates of the starting point and ending point of the vector and other data. More concretely, vector data is supplied in sequence along the outline of the figure, and a flag is then added to the vector information to indicate the continuity of the vectors (that is, the vectors are connected with each other so as to form the figure).

In an example of the above mentioned operations, in the figure of the closed curved line $CL_1$ as shown in FIG. 5A, vectors are supplied in sequence along the outline of the figure $CL_1$, that is, vectors $V_1$, $V_2$, $V_3$, . . . $V_{10}$, and in the figure of the closed curved line $CL_2$, vectors are supplied in sequence along the outline of the figure $CL_2$, that is, vectors $V_{11}$, $V_{12}$, . . . $V_{14}$. Thus, the continuity flags an,d the coordinate values for the starting points and the ending points of the vectors are registered as shown in FIG. 6. Each continuity flag comprises an identification number and a direction value, both of which are determined in this operation. The identification number corresponds to the closed curved line, which number indicates that the number corresponds to the figure comprising the continuous line. The direction value represents the direction ("1" represents downward; and "2" represents upward) of the corresponding vector, which value is located at the end of the above mentioned identification number.

In an example of the above mentioned operation, the vector $V_1$ as shown in FIG. 5A belongs to the closed curved line $CL_1$, and the direction thereof is downward (from top right to bottom left of FIG. 5A)., Thus, the continuity flag for the vector $V_1$ is determined to be "11", as shown in the top row of the table of FIG. 6. In another example of such a continuity flag, the vector $V_2$ as shown in FIG. 5A also belongs to the closed curved line $CL_1$, and the direction thereof is also downward (from top right to bottom left). Thus, the continuity flag for the vector $V_2$ is also determined to be "11", as shown in the second row of the table of FIG. 6.

Further, when the line registration is performed by the vector image drawing apparatus, vertex flags are also added to the vector information to indicate top and bottom vertexes of the figure. "1" is allocated as the vertex flag for the top vertex of the figure, and "−1" is allocated as the vertex flag for the bottom vertex of the figure. If neither the starting nor the ending point of the vector is a vertex of the figure, "0" is allocated. These vertexes can be easily detected as a result of detecting the changing of the vector's direction from the downward direction to the upward one, or vice versa.

Figure 7:
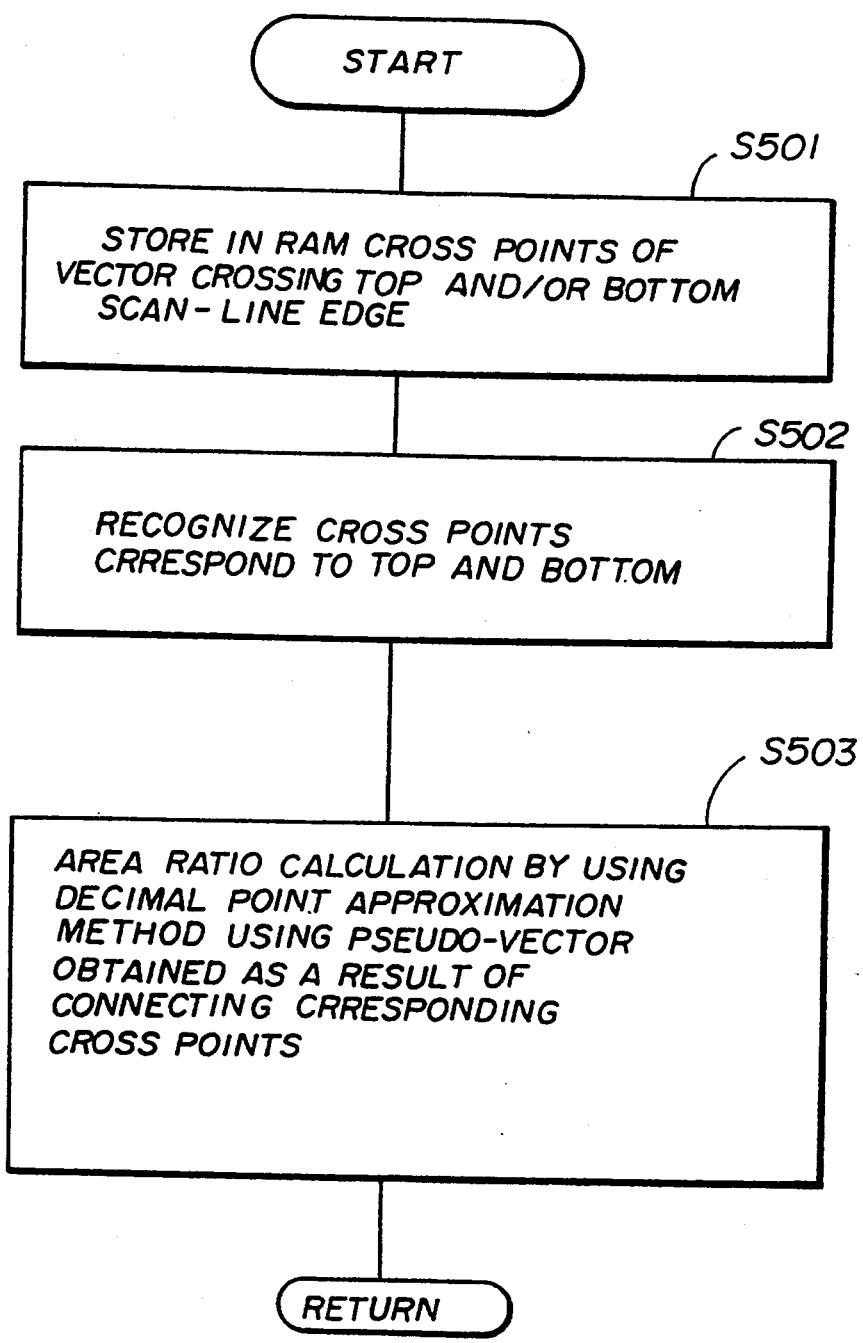
FIG. 7 shows an operation flow chart of a process for calculating the approximated area ratio.

An approximated area ratio calculation process is describe below with reference to FIG. 7. The approximated area ratio calculation process is executed in the above mentioned painting-out process by the scan-line of S309 in FIG. 4B.

A vector crossing the top and/or bottom 20 scan-line edge(s) is extracted, coordinate values of this cross point then being stored in RAM 204 (S501). (The top and bottom scan line edges may comprise both groups of sides of the plurality of pixels, both the groups of sides of the plurality of pixels being positioned opposite each other.) Then, cross points of the vector(vectors)to be connected with each other are determined as a result of selecting from cross points with respect to the top and/or bottom scan-line edge(s) stored in the RAM 204, by referring to (a) previously added continuity flag(s) (S502). For example, the following cross points are selected from the cross points crossing the top and/or bottom scan-line edge(s) so that the cross points to be connected with each other are determined: the cross points belonging to one vector $V_n$; or the cross points respectively belonging to vectors $V_n$ and $V_{n+1}$, continuity flags of both vectors being the same as each other.

Then, the pseudo-vector obtained as a result of connecting the two cross points determined to be connected to each other as mentioned above is produced(-the process of producing the pseudo-vector). The pseudo-vector acts as the pseudo-edge-line. Then, the approximated area ratio is calculated by using the below ,described decimal point approximation method (S503). (The decimal point approximation method acts as the approximated area ratio determination means.)

In an example of the above mentioned operation, the following operations are executed for the scan-line $SL_{15}$ comprising the top scan-line edge y=15 and the bottom scan-line edge y=16 of FIG. 5A:

The vectors $V_2$ and $V_9$ respectively have cross points crossing the top scan-line edge (a line of y=15) of the scan-line $SL_{15}$, and the vectors $V_3$, $V_{11}$, $V_{14}$, and $V_8$ respectively have cross points crossing the bottom scan-line edge (a line of y=16) of the scan-line $SL_{15}$. Then, all these vectors corresponding to the scan-line edges are stored in the RAM 204 as mentioned in S501. Then, if continuity flags of respective vectors are the same as each other, cross points are determined to be connected to each other, which cross points respectively belong to the above mentioned respective vectors, as mentioned above in S502. Thus, cross points respectively belonging to respective vectors $V_2$ and $V_3$ are determined to be connected to each other as a result of selecting cross points from cross points stored in the RAM 204 which correspond to both top and bottom scan-line edges, as mentioned above. Further, cross points respectively belonging to respective vectors $V_9$ and $V_8$ are determined to be connected to each other as a result of selecting cross points from the cross points stored in the RAM 204 which correspond to both top and bottom scan-line edges, as mentioned above.

Then, each pseudo-vector is respectively obtained as shown in FIG. 5B as a result of connecting respective cross points with each other, which cross points are determined to be connected to each other, as mentioned above. Then, as mentioned below, an approximated area ratio is calculated by using these pseudo-vectors.

When the top end vertex or the bottom end vertex of the figure is present in the scan-line being processed, the process shown in FIG. 8 is executed.

When the top end vertex or the bottom end vertex of the figure is present in the scan-line being processed (S601), the Y-coordinate of the existing vertex is changed to the Y-coordinate of the top scan-line edge of the scan-line if the existing vertex is the top end vertex of the figure, or the Y-coordinate of the existing vertex is changed to the Y-coordinate of the bottom scan-line edge of the scan-line if the existing vertex is the bottom end vertex of the figure (S602). Then, the approximated area ratio is calculated by using the decimal point approximation method for pseudo-vectors constituted of these changed coordinates (S603).

Figure 9A:
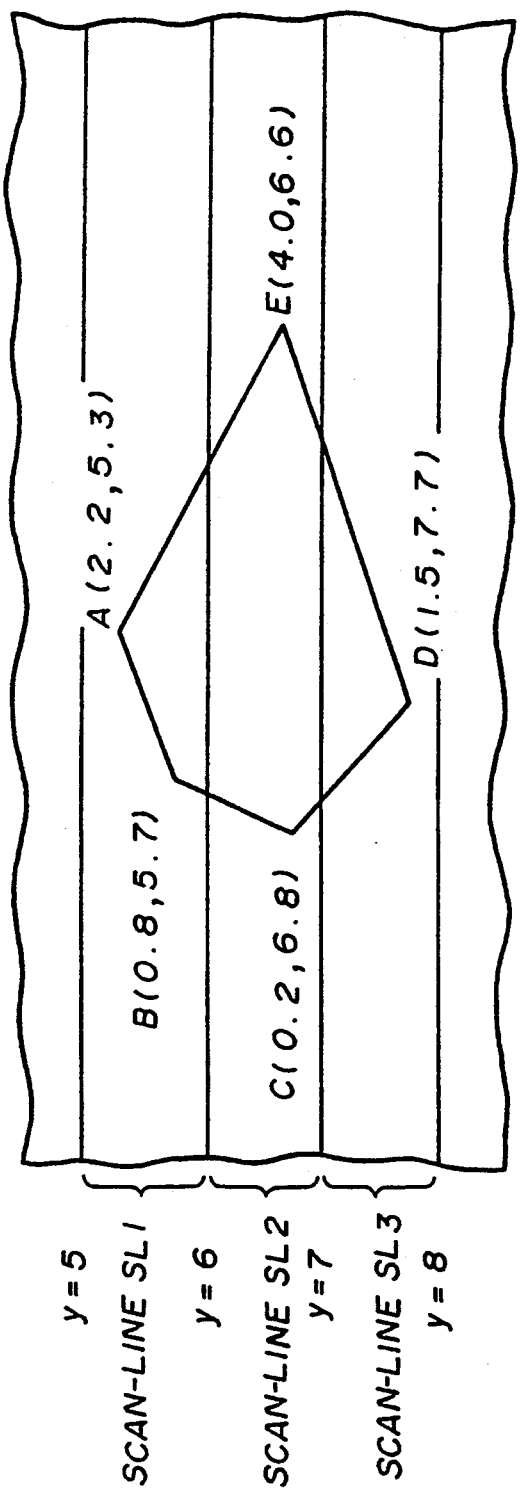

In an example of the above mentioned operations, as shown in FIG. 9A, the vertex A is detected during processing of the scan-line $SL_1$, then the Y-coordinate 5.3 of the coordinates (2.2, 5.3) of the vertex A is changed to a vertex Aa having the Y-coordinate 5.0 the same as that of the top scan-line edge of the scan-line $SL_1$. Thus, the figure is changed to that in the scan-line $SL_1$ shown in FIG. 9B. Then, as mentioned below, the approximated area ratio is calculated by using the decimal point approximation method based on the changed coordinates of the vertex A.

A calculation method (decimal point approximation method), for obtaining the approximated area ratio of the edge part pixel, is described in detail below with reference to FIGS. 10, 11, and 12. In this method, the decimal fraction part of the X-coordinate or the Y-coordinate of one of the two cross points produced when the pseudo-vector passes through the edge part pixel, is used.

Figure 10:
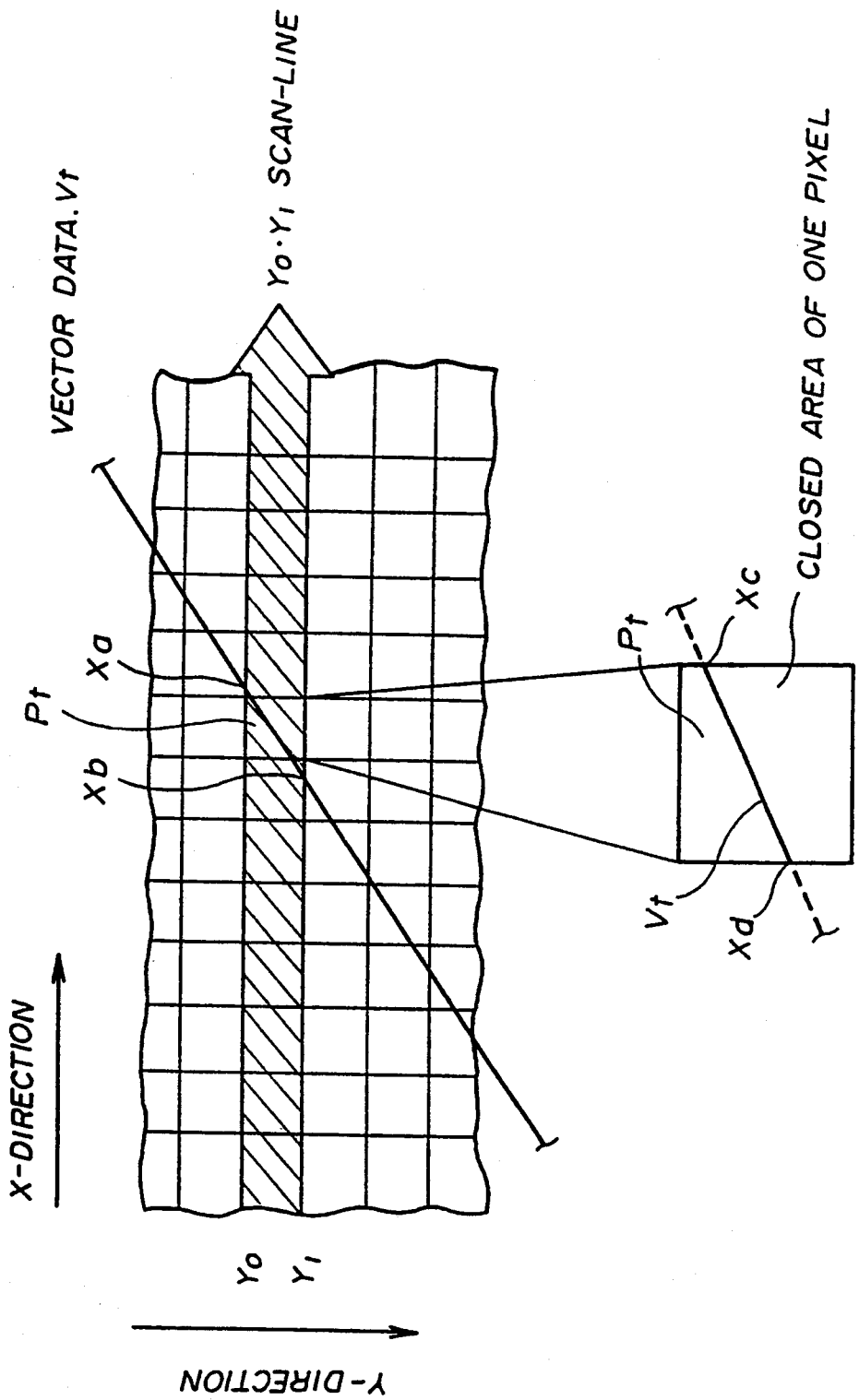
FIG. 10 illustrates a process for calculating the approximated area ratio by the decimal point approximating method.

As shown in FIG. 10, in a case where vector data Vt (representing the pseudo-vector in this case) crosses the $Y_0$-$Y_1$ scan-line, the cross point Xa crossing the top scan-line edge $Y_0$ and the cross point Xb crossing the bottom scan-line edge $Y_1$ are produced. These two cross points Xa and Xb for the respective scan-line edges $Y_0$ and $Y_1$ are produced because the scan-line has a thickness of one pixel (that is, the thickness of $Y_0$-$Y_1$).

With regard to the particular edge part pixel Pt on the scan-line, which pixel is a closed area, two other cross points Xc and Xd are produced as shown in FIG. 10 when the vector data Vt passes through the closed area of the edge part pixel Pt. These two cross points Xc and Xd respectively correspond to the input and output coordinate values with respect to the edge part pixel Pt.

As mentioned above, one of the cross points of the two cross points produced when the vector data Vt crosses the scan-line $Y_0$-$Y_1$, which one cross point is located inside of the image part (a part in the image to be painted so as to be dark), is referred to as Xa, and the other cross point is referred to as Xb. As also mentioned above, similarly, one cross point of the two cross points respectively corresponding to input and output coordinate values, which one cross point is located inside the image part, is referred to as Xc, and the other cross point of the two cross points is referred to as Xd. FIG. 10 shows the case where the right side part of the vector data Vt is the image part. Of course, in case where the left side part of the vector data Vt is the image part, Xa should be changed to Xb, and vice versa, and Xc should be changed to Xd, and vice versa.

The input and output coordinate values are determined as mentioned above, then the approximated area ratio k is obtained by using the decimal fraction part of the Y-coordinate value of Xc, or the decimal fraction part of the X-coordinate value of Xd, in the scan-line which is to be processed, based on the following information: whether or not the plurality of edge part pixels are produced by vector data; whether the right edge or the left edge of the image part is the produced pixel; and whether the top edge or the bottom edge of the image part is the produced pixel.

A case where, in the scan-line which is to be processed, only one edge part pixel is produced by the vector data, is described below with reference to FIGS. 11A, 11B, 11C, and 11D. The condition of the above mentioned case can be easily identified because it is a condition where an absolute value of the difference between the X-coordinate of Xa and that of Xb is less than 1 pixel width.

Figure 11A:
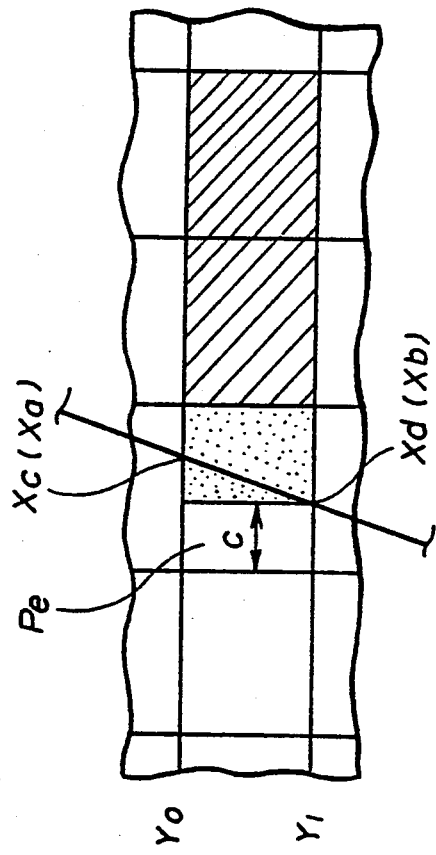
FIGS. 11A, 11B, 11C and 11D illustrate a process for calculating the approximated area ratio by the decimal point approximating method.

FIG. 11A shows a case where the edge part pixel Pe produced is only one pixel at the top, left edge of the image part. In this case, the approximated area ratio k is calculated in accordance with $k=1-c$, where "c" is the decimal fraction part of the X-coordinate of Xd (the cross point which is located outside of the image part) corresponding to one of input and output coordinate values. In other words, the area occupied by the image part in the pixel Pe is approximated into an area of $(1-c)$, that is, the dotted area in FIG. 11A, where the area of 1 pixel is a 1*1 square (a square having the dimension of 1 in each edge).

Figure 11B:
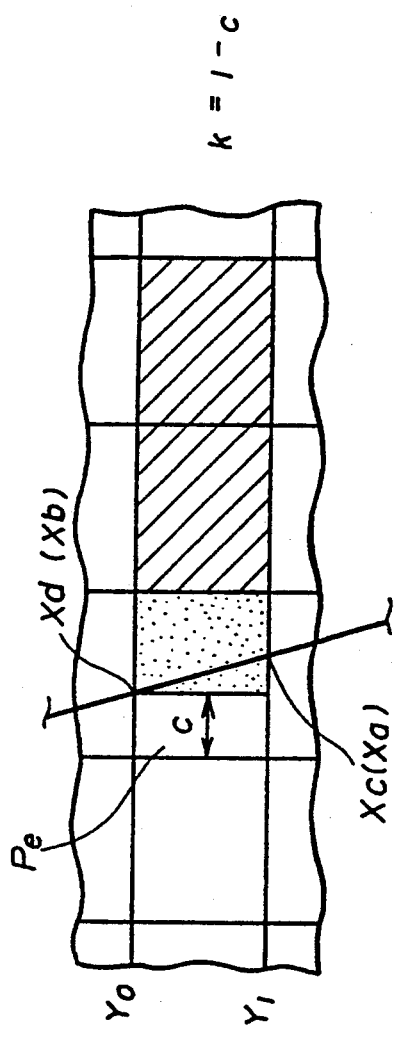

FIG. 11B shows a case where the edge part pixel Pe produced is only one pixel at the bottom, left edge of the image part. In this case, the approximated area ratio k is calculated in accordance with $k=1-c$, where "c" is the decimal fraction part of the X-coordinate of Xd (the cross point which is located outside the image part) corresponding to one of the input and output coordinate values.

Figure 11C:
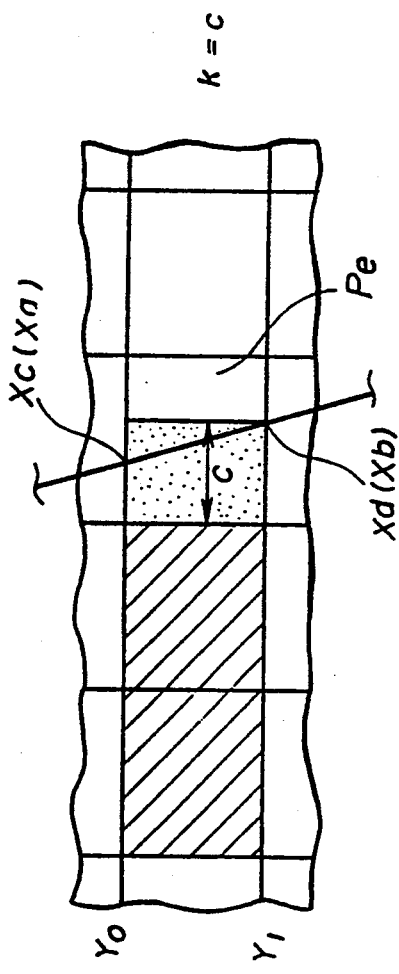

FIG. 11C shows a case where the edge part pixel Pe produced is only one pixel at the top, right edge of the image part. In this case, the approximated area ratio k is calculated in accordance with $k=c$, where "c" is the decimal fraction part of the X-coordinate of Xd (a cross point which is located outside of the image part) corresponding to one of the input and output coordinate values.

Figure 11D:
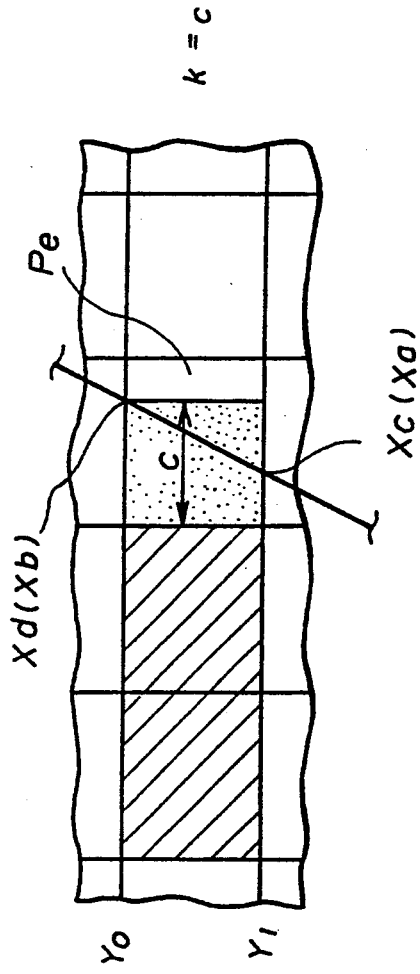

FIG. 11D shows a case where the edge part pixel Pe produced is only one pixel at the bottom, right edge of the image part. In this case, the approximated area ratio k is calculated in accordance with $k=c$, where "c" is the decimal fraction part of the X-coordinate of Xd (the cross point which is located outside of the image part) corresponding to one of the input and output coordinate values.

A case where, in the scan-line which is to be processed, a plurality of edge part pixels is produced by the vector data, is described below with reference to FIGS. 12A, 12B, 12C, and 12D. The condition of the above mentioned case can be easily identified because it is a condition where an absolute value of the difference between the X-coordinate of Xa and that of Xb is more than 1 pixel width.

Figure 12A:
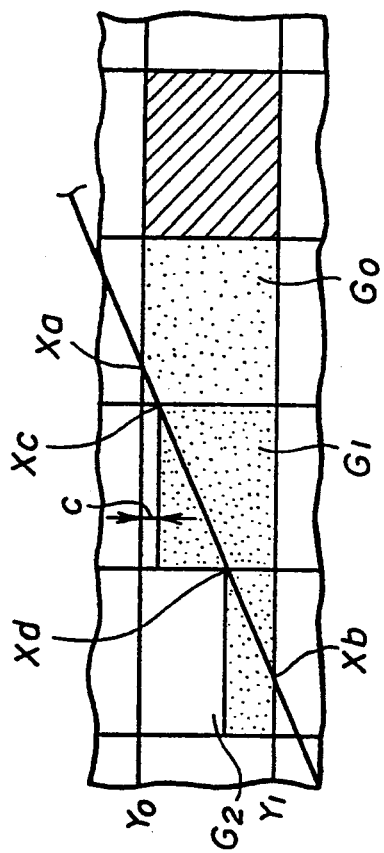
FIGS. 12A, 12B, 12C and 12D illustrate a process for calculating the approximated area ratio by the decimal point approximating method.

FIG. 12A shows a case where the edge part pixels are a plurality of pixels at the top, left edge of the image part. In this case, the approximated area Patio k is calculated in accordance with $k=1-c$, where "c" is the decimal fraction part of the Y-coordinate of Xc (a cross point which is located inside the image part) corresponding to one of the input and output coordinate values. The three edge part pixels in FIG. 12A are, for example, referred to as $G_0$, $G_1$, and $G_2$, in an order starting from the edge part pixel which is located inside the image part to the edge part pixel which is located outside the image part. Then, the approximated area ratio k with respect to the pixel $G_1$ is easily calculated as mentioned above by using the decimal fraction part "c" of the Y-coordinate of the cross point Xc corresponding to one of the input and output coordinate values.

Figure 12B:
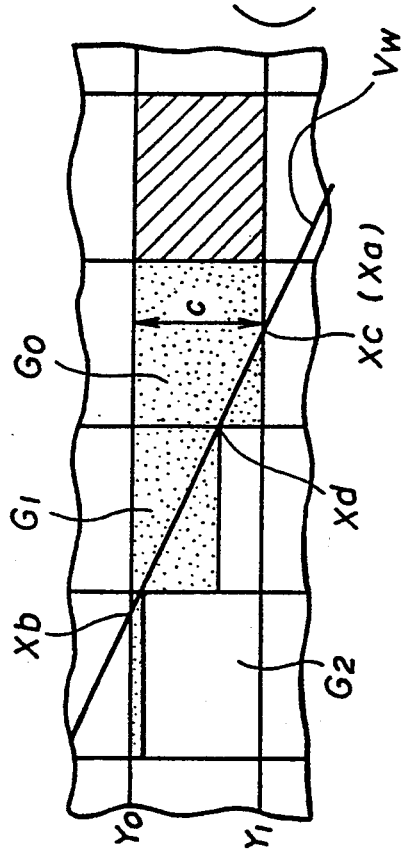

FIG. 12B shows a case where the edge part pixels are a plurality of pixels at the bottom, left, edge of the image part. In this case, the approximated area ratio k is calculated in accordance with $k=c$, where "c" is the decimal fraction part of the Y-coordinate of Xc (the cross point which is located inside the image part) corresponding to one of the input and output coordinate values. However, $k=1$ in a case where, in the edge part pixel $G_0$ shown in FIG. 12B, the cross point Xc, corresponding to one of the input and output coordinate values, coincides with the cross point Xa produced as a result of the vector data Vw crossing the scan-line edge $Y_1$ of the $Y_0.Y_1$ scan-line.

Figure 12C:
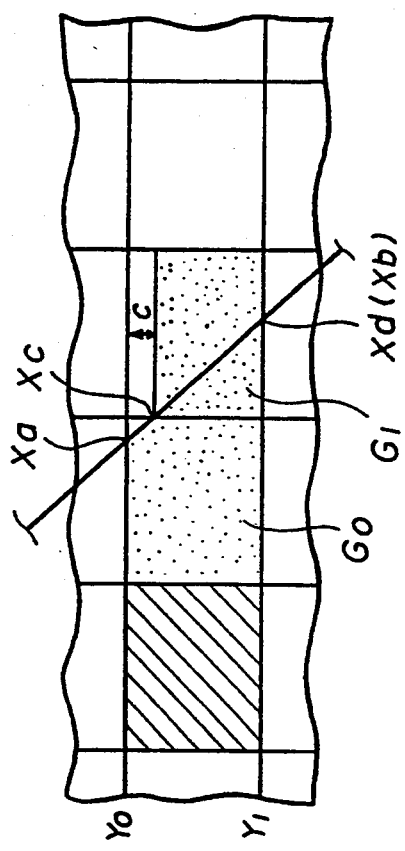

FIG. 12C shows a case where the edge part pixels are a plurality of pixels at the top, right edge of the image part. In this case, the approximated area ratio k is calculated in accordance with $k=1-c$, where "c" is the decimal fraction part of the Y-coordinate of Xc (the cross point which is located inside the image part) corresponding to one of the input and output coordinate values.

Figure 12D:
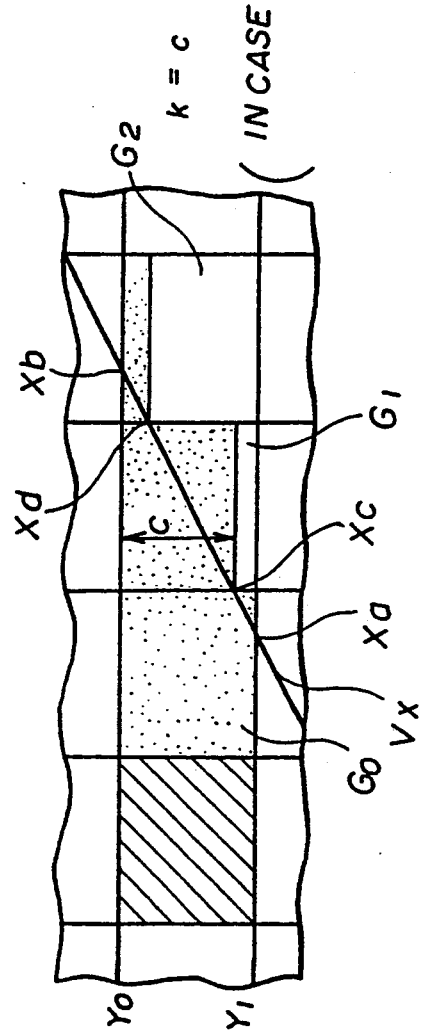

FIG. 12D shows a case where the edge part pixels are a plurality of pixels at the bottom, right edge of the image part. In this case, the approximated area ratio k is calculated in accordance with $k=c$, where "c" is the decimal fraction part of the Y-coordinate of Xc (the cross point which is located outside the image part) corresponding to one of the input and output coordinate values. However, $k=1$ in a case where, in the edge part pixel $G_0$ shown in FIG. 12B, the cross point Xc, corresponding to one of the input and output coordinate values, coincides with the cross point Xa, produced as a result of the vector data Vx crossing the scan-line edge $Y_1$ of the $Y_0.Y_1$ scan-line.

In the above mentioned embodiment, the continuity flag is used to indicate the mutual continuity of the vectors in the scan-line process. The continuity flag, in the embodiment, has the following two functions. The first function is to indicate respective closed curved lines in the path (in the figure), comprising each vector. The second function is to indicate either upward or downward direction, on the outlines of the respective closed curved lines, each vector having the direction. However, the continuity flag is not limited to such functions, and it may have any other function which indicates the continuity of the vectors.

Further, in the above mentioned embodiment, the vertex flag is added, previous to detecting the presence of the vertex, to the vector information, and whether the top and/or bottom vertexes are present is thus detected by referring to the vertex flag. However, the top and/or bottom vertexes detecting method is not limited to the above one, and another method is usable in which the top and/or bottom vertexes are detected, in the scan-line process, by referring to the coordinates of the starting and ending points of the vector being processed.

The features and advantages of the above mentioned vector image drawing apparatus of the embodiment according to the present invention are described below.

The continuity information is produced. This continuity information indicates the mutual continuity of the plurality of vector data which forms the outline of the figure. Then, the continuity information is added to the vector information. Then, the pseudo-vector is produced, based on the continuity information, by using the information with regard to the vector data crossing the top and bottom scan-line edges, which edges sandwich the scan-line. Then, the approximated area ratio is calculated by using the decimal fraction part of the X-coordinate or the Y-coordinate of one of the two cross points, which cross points are produced when the pseudo-vector passes the edge part pixel.

Further, the Y-coordinate of the top or bottom vertex of the figure is changed to the scan-line edge when the top or bottom vertex is not present just on the scan-line edges but instead present in the scan-line (between both scan-line edges). Then, the above mentioned pseudo-vector is produced by using this changed vertex. Thus, the appropriate approximated area ratio with respect to the vertex part of the figure is obtained.

Two advantages resulting from the above mentioned features are described below.

The first advantage is that the approximated area ratio can be obtained at a high rate of speed, without executing an operation such as the above mentioned dividing of and counting of the sub-pixels overlapped by the image part and other extra operations. The above mentioned approximated area ratio is used for determining the darkness of each pixel located on an edge of an image part as mentioned above. However, this approximated area ratio is determined only by the decimal fraction part of the input and output coordinate values where vector data (pseudo-vector) enters into and exits from the edge part pixel.

The second advantage is that fine quality character printing is ensured even if a high speed algorithm such as the above mentioned decimal point approximation method is applied when the area ratio in the anti-aliasing process is calculated for, for example, one of the following figures of the image: the figure constituted of the group of vectors, the Y-direction height of each vector being smaller than the width of the scan-line; a figure including the figure part where one edge part on the scan-line is constituted of a plurality of vectors; and the figure including a vertex part of the figure present in a scan-line but not present just on the scan-line edges.

Further, the present invention is not limited to the above described embodiment, and variations and modifications may be made without departing from the scope of the present invention.

What is claimed is:

1. An image drawing apparatus comprising:
   a) cross point detecting means for detecting positions of cross points produced as a result of an image's edge crossing sides of pixels, each cross point dividing a crossed side of a relevant pixel into two divided portions;
   b) approximated area ratio determination means for determining approximated area ratios for the pixels obtained as a result of approximating area ratios of areas occupied by the image in the pixels by using the positions of the cross points, wherein each of the approximated area ratios for the pixels is a ratio of:
      1) a length of one of the two divided portions, to
      2) a full length of one of the crossed sides of the relevant pixel; and
   c) character determination means for determining characters of the pixels in accordance with the approximated area ratios for the pixels.

2. The image drawing apparatus according to claim 1, wherein said approximated area ratio determination means approximates said area ratio by a length ratio of two lengths obtained as a result of said cross point dividing said side of said pixel.

3. The image drawing apparatus according to claim 1, further comprising straight line approximating means for approximating said edge of said image by a plurality of straight lines if said edge of said image comprises a curved line, said cross point detecting means detecting cross points of said plurality of straight lines crossing sides of said respective pixels.

4. The image drawing apparatus according to claim 3, further comprising a pseudo-edge-line forming for forming a pseudo-edge-line by connecting said respective cross points of said plurality of straight lines crossing both said groups of sides of a plurality of pixels, said groups of sides of said plurality of pixels being positioned opposite each other, said plurality of pixels being adjacent to each other in a scanning direction, said groups of sides of said plurality of pixels extending in said scanning direction, and said cross point detecting means detecting said positions of said cross points of said pseudo-edge-line crossing both said groups of sides of said plurality of pixels.

5. The image drawing apparatus according to claim 4, wherein, if said plurality of straight lines cross only the first group of sides of said plurality of said pixels, said pseudo-edge-line forming means forms a pseudo-edge-line so that said pseudo-edge-line crosses the first group and the second group of sides of said plurality of pixels 6. The image drawing apparatus according to claim 3, further comprising continuity information generating means for generating information indicating mutual continuity of said plurality of straight lines, said continuity information being used by said pseudo-edge-line forming means.

7. The image drawing apparatus according to claim 1, wherein said approximate area ratio determination means includes:
   means for using the cross point on a certain crossed side of the two sides of the relevant pixel, the certain crossed side being determined so that the resulting approximated area ratio is larger than the approximated ratio that would result if the other crossed side were used.

8. The image drawing apparatus according to claim 1, wherein said approximated area ratio determination means includes:
   means for using the cross point on a certain crossed side of the two crossed sides of the relevant pixel;
   wherein, if the two sides are (1) the certain crossed side extending perpendicular to the scanning direction and (2) the other side extending along the scanning direction, the certain crossed side is the crossed side which extends perpendicular to the scanning direction.

9. An image drawing apparatus comprising:
   a) pseudo-edge-line forming means for forming a pseudo-edge-line by forming a straight line between first cross points of an image's edge, wherein:
      1) the first cross points are obtained as a result of the image's edge crossing both a first group and a second group of sides of pixels,
      2) the two groups of sides of said pixels are positioned opposite each other,
      3) the pixels are adjacent to each other in a scanning direction, and
      4) the two groups of sides of the pixels extend in the scanning direction;
   b) cross point detecting means for detecting positions of second cross points produced as a result of the pseudo-edge-line crossing sides of the pixels, each second cross point dividing a second crossed side of a relevant pixel into two divided portions;

c) approximated area ratio determination means for determining approximated area ratios for the pixels obtained as a result of approximating area ratios of areas occupied by the image in the pixels by using the positions of the second cross points, wherein each of the approximated area ratios for the pixels is a ratio of:
1) a length of one of the two divided portions, to
2) a full length of one of the two second crossed sides of the relevant pixel; and
d) character determination means for determining characters of the pixels in accordance with the approximated area ratios for the pixels.

10. The image drawing apparatus according to claim 3, wherein, if said image's edge crosses only the first group of sides of said plurality of said pixels, said pseudo-edge-line forming means forms a pseudo-edge-line so that said pseudo-edge-line crosses the first group and the second group of sides of said plurality of pixels.

11. The image drawing apparatus according to claim 3, further comprising continuity information generating means for generating information indicating mutual continuity of lines constituting said edge of said image, said continuity information being used by said pseudo-edge-line forming means.

12. The image drawing apparatus according to claim 3, wherein said approximate area ratio determination means includes:
means for using the second cross point on a certain crossed side of the two second crossed sides of the relevant pixel, the certain crossed side being determined so that the resulting approximated area ratio is larger than the approximated area ratio that would result if the other crossed side were used.

13. The image drawing apparatus according to claim 3, wherein said approximated area ratio determination means includes:
means for using the second cross point on a certain crossed side of the two second crossed sides of the relevant pixel;
wherein, if the two second crossed sides are (1) the certain crossed side extending perpendicular to the scanning direction and (2) the other side extending along the scanning direction, the certain crossed side is the crossed side extending perpendicular to the scanning direction.

14. An image drawing method comprising the steps of:
a) detecting positions of cross points produced as a result of an image's edge crossing sides of pixels, each cross point dividing a crossed side of a relevant pixel into two divided portions;
b) determining approximated area ratios for the pixels obtained as a result of approximating area ratios of areas occupied by the image in the pixels by using the positions of the cross points, wherein each of the approximated area ratios for the pixels is a ratio of:
1) a length of one of the two divided portions, to
2) a full length of one of the crossed sides of the relevant pixel; and
c) determining characters of the pixels in accordance with the approximated area ratios for the pixels.

15. The image drawing method according to claim 14, wherein said step (b) approximates said area ratio by a length ratio of two lengths obtained as a result of said cross point dividing said side of said pixel.

16. The image drawing method according to claim 14, further comprising a step (f) for approximating said edge of said image by a plurality of straight lines if said edge of said image comprises a curved line, said step (a) detecting cross points of said plurality of straight lines crossing sides of said respective pixels.

17. The image drawing apparatus according to claim 16, further comprising a step (d) for forming a pseudo-edge-line by connecting said respective cross points of said plurality of straight lines crossing both groups of sides of a plurality of pixels, said groups of sides of said plurality of said pixels being positioned opposite each other, said plurality of pixels being adjacent to each other in a scanning direction, said groups of sides of said plurality of pixels extending in said scanning direction, and said step (a) detecting said positions of said cross points of said pseudo-edge-line crossing said groups of sides of said plurality of pixels.

18. The image drawing apparatus according to claim 17, wherein, if said plurality of straight lines cross only the first group of sides of said plurality of pixels, said step (d) forms a pseudo-edge-line so that said pseudo-edge-line cross the first group and the second group of sides of said plurality of pixels.

19. The image drawing apparatus according to claim 17, further comprising a step (e) for generating information indicating mutual continuity of said plurality of straight lines, said continuity information being used by said pseudo-edge-line forming means.

20. The image drawing method according to claim 14, wherein said area ratio determining step includes:
using the cross point on a certain crossed side of the two sides of the relevant pixel, the certain crossed side being determined so that the resulting approximated area ratio is larger than the approximated ratio that would result if the other crossed side were used.

21. The image drawing method according to claim 14, wherein said approximated area ratio determining step includes:
using the cross point on a certain crossed side of the two crossed sides of the relevant pixel;
wherein, if the two sides are (1) the certain crossed side extending perpendicular to the scanning direction and (2) the other side extending along the scanning direction, the certain crossed side is the crossed side which extends perpendicular to the scanning direction.

22. An image drawing method comprising the steps of:
a) forming a pseudo-edge-line by forming a straight line between first cross points of an image's edge, wherein:
1) the first cross points are obtained as a result of the image's edge crossing both groups of sides of pixels,
2) the groups of sides of pixels are positioned opposite each other,
3) the pixels are adjacent to each other in a scanning direction, and
4) the two groups of sides of pixels extend in the scanning direction;
b) detecting positions of second cross points produced by an image's edge crossing sides of pixels, each second cross point dividing a crossed side of a relevant pixel into two divided portions;
c) determining approximated area ratios for the pixels obtained as a result of approximating area ratios of areas occupied by the image in the pixels by using the positions of the second cross points, wherein each of the approximated area ratios for the pixels is a ratio of:
1) a length of one of the two divided portions, to
2) a full length of one of the crossed sides of the relevant pixel; and d) determining characters of the pixels in accordance with the approximated area ratios for the pixels.

23. The image drawing method according to claim 22, wherein, if said image's edge crosses only the first group of sides of said plurality of pixels, said step (d) forms a pseudo-edge-line so that said pseudo-edge-line also crosses the first group and the second group of sides of said plurality of pixels.

24. The image drawing method according to claim 22, further comprising a step (e) for generating information indicating mutual continuity of lines constituting said edge of said image, said continuity 25. The image drawing method according to claim 12, wherein said approximated area ratio determining step includes:
using the second cross point on a certain crossed side of the two second crossed sides of the relevant pixel, the certain crossed side being determined so that the resulting approximated area ratio is larger than the approximated area ratio that would result if the other crossed side were used.

26. The image drawing method according to claim 22, wherein said approximated area ratio determining step includes:
using the second cross point on a certain crossed side of the two second crossed sides of the relevant pixel;
wherein, if the two second crossed sides are (1) the certain crossed side extending perpendicular to the scanning direction and (2) the other side extending along the scanning direction, the certain crossed side is the crossed side extending perpendicular to the scanning direction.

* * * * *